TRANSMISSION NETWORK USING TRANSISTORS
Filed Aug. 26, 1952

INVENTOR
J. T. BANGERT
BY
Ralph P. Holcomb
ATTORNEY

United States Patent Office 2,728,053

Patented Dec. 20, 1955

2,728,053

TRANSMISSION NETWORK USING TRANSISTORS

John T. Bangert, Summit, N. J., assignor to Bell Telephone Laboratories, Incorporated, New York, N. Y., a corporation of New York Application August 26, 1952, Serial No. 306,430

8 Claims. (Cl. 333—80)

This invention relates to wave transmission networks and more particularly to networks employing a plurality of transistors to provide shunt negative resistance.

An object of the invention is to provide negative resistance of the shunt type. Another object is to provide an improved shunt negative-resistance network which has only two terminals. A further object is to improve the transmission characteristics of wave transmission networks, such as filters, by compensating the dissipation associated with the network branches.

In one embodiment of the invention, two transistors, a source of voltage, and associated capacitors and resistors are arranged to form a two-terminal network which will provide a negative resistance of the shunt type, that is, one which is voltage-controlled or short-circuit stable. The transistors are of the type having a base, a collector, and an emitter. The transistors are coupled by a resistance-capacitance network and each emitter is connected to the base through a resistor to reduce gain variations. The final output is returned to the initial input via a feedback path including a resistor which may be made adjustable in order to control the magnitude of the negative resistance developed by the network.

In accordance with a further embodiment of the invention, a negative-resistance device of this type is shunted across all or a portion of a reactive impedance branch of a wave transmission network to compensate the undesired energy dissipation associated with the network. The shunted portion of the impedance branch may comprise only an inductor or an inductor in parallel with a capacitor, and may include additional reactive elements. As examples of networks to which the invention is applicable, high-pass, band-pass, and band-elimination wave filters of the ladder type are disclosed. The negative resistance may be incorporated in either a series or a shunt branch of the filter, and more than one negative resistance may be used if desired. The negative resistance may, if desired, be made of the proper magnitude to compensate not only the dissipation in the branch to which it is connected, but also part or all of that associated with one or more of the other filter branches, especially throughout the pass band and in the regions of transition from transmission to attenuation. The transmission characteristics of the filters are thus greatly improved by sharpening the cut-offs, reducing and flattening the loss in the pass bands, and increasing the attenuation in the suppression bands.

Figure 1:
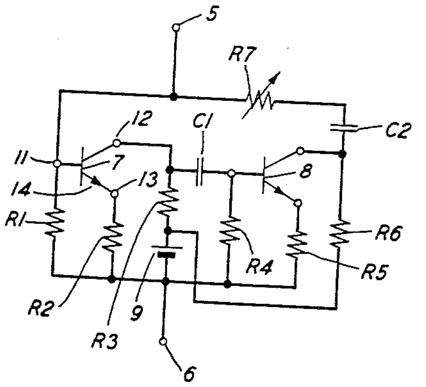
Figure 2:
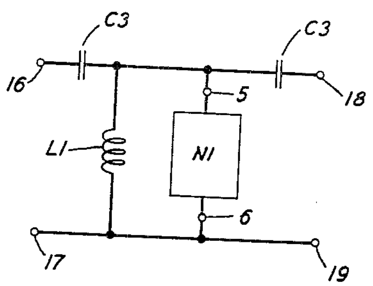
Figure 3:
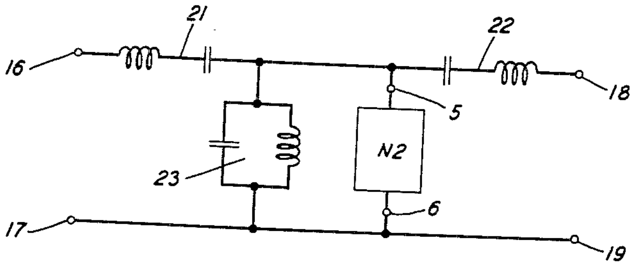
Figure 4:
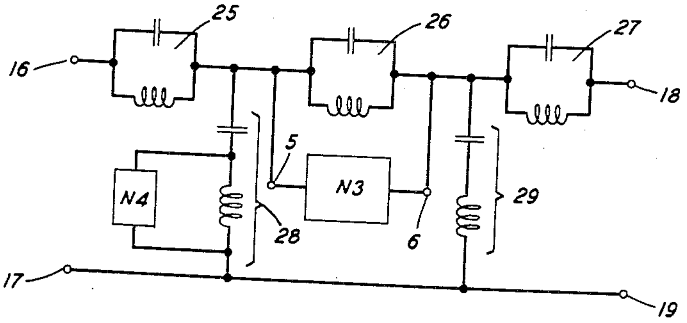

The nature of the invention and its various objects, features, and advantages will appear more fully in the following detailed description of preferred embodiments illustrated in the accompanying drawing, of which Fig. 1 is a schematic circuit of a two-terminal network in accordance with the invention for providing shunt negative resistance; and Figs. 2, 3, and 4 are schematic circuits respectively, of a high-pass, a band-pass, and a band-elimination wave filter embodying the invention.

The embodiment of the shunt negative-resistance network in accordance with the invention shown schematically in Fig. 1 comprises two terminals 5 and 6, two transistors 7 and 8, a source of direct voltage 9, two capacitors C1 and C2, and seven resistors designated R1 to R7. Each of the transistors comprises a base, a collector, and an emitter, which, in the transistor 7, are connected, respectively, to the terminals 11, 12, and 13. The transistors may be either of the point-contact type or the junction type, but the latter is preferred because, in general, it provides a more constant value of negative resistance for given applied potentials. Transistors of the junction type are described in detail, for example, in the paper by William Shockley entitled "The theory of p-n junctions in semiconductors and p-n junction transistors," published in the Bell System Technical Journal, vol. XXVIII, pages 435 to 489, July 1949, and those of the point-contact type in United States Patent 2,524,035, to John Bardeen and Walter H. Brattain, issued October 3, 1950. In Fig. 1, the symbol used for the transistors indicates that they are of the junction type, inasmuch as the arrowhead 14 associated with the emitter points toward the terminal 13. In the symbol for a point-contact transistor, this arrowhead is reversed.

As shown in Fig. 1, the network terminal 5 is connected to the base terminal 11 of the transistor 7. The network terminal 6 is connected through the resistor R2 to the emitter terminal 13 of the transistor 7, and through the resistor R5 to the emitter of the transistor 8. The transistors are coupled by a resistance-capacitance network comprising the resistor R3 connected between the collector terminal 12 of the transistor 7 and the network terminal 6, the capacitor C1 between the collector of the transistor 7 and the base of the transistor 8, and the resistor R4 between the base of the transistor 8 and the terminal 6. In order to reduce gain variations and thereby stabilize the negative resistance, each emitter is provided with an electrical path to the associated base which includes resistance. In the transistor 7, this path includes the resistors R1 and R2, and in the transistor 8 it includes the resistors R4 and R5. The junction point of the resistors R1 and R2 and the junction point of the resistors R4 and R5 are connected to the network terminal 6. The resistor R6 connected between the collector of the transistor 8 and the terminal 6 is in the nature of a load. The voltage source 9, connected on the negative side to the terminal 6, supplies current through the resistor R3 to the collector of the transistor 7, and through the resistor R6 to the collector of the transistor 8. An alternating-current feedback path including the resistor R7 is provided between the collector of the transistor 8 and the base of the transistor 7. As indicated by the arrow, this resistor may be made adjustable so that the magnitude of the negative resistance effective between the terminals 5 and 6 may be controlled. The capacitor C2 is included in this path in order to keep the direct-current voltage from the source 9 off of the base of the transistor 7. In some applications of the network, it may be desirable to include a blocking capacitor in series with one of the network terminals. Typical values for the component elements are a half microfarad for each of the capacitors C1 and C2, 2000 ohms for the resistor R2, 11,000 ohms for R5, 20,000 ohms for each of the resistors R1, R3, R4, and R6, and 4.5 volts for the source 9. The resistor R7 may conveniently be adjustable between 1000 and 20,000 ohms.

Some advantages of a negative-resistance network employing transistors instead of thermionic devices as the active elements are that the transistor does not require an evacuated or gas-filled envelope, or a heated cathode, requires no warm-up time, has little heat to be dissipated, consumes much less power, is smaller and lighter, and has a longer useful life.

A two-terminal shunt negative resistance network of he type shown in Fig. 1 is well adapted for compensating he energy dissipation associated with the reactive impedance branches of wave transmission networks. Figs. 2, 3 and 4 show, by way of example only, additional embodiments of the invention in which the network of Fig. 1 is connected in shunt with all or a portion of a reactive impedance branch of a wave filter.

Fig. 2 shows a mid-series terminated, constant-k, high-pass filter section of the ladder type. The filter has a pair of input terminals 16, 17, to which a suitable source of alternating-current signals may be connected, and a pair of output terminals 18, 19, to which a suitable load impedance may be connected. Since the filter section is unbalanced, the terminals 17 and 19 may be grounded or otherwise fixed in potential. The filter comprises two series capacitors C3, C3 and an interposed shunt branch which includes an inductor L1. A shunt negative-resistance network N1, which may be of the type shown in Fig. 1 between the terminals 5 and 6, is connected in shunt with the inductor L1. The network N1 compensates the undesired dissipation associated with the inductor L1, especially throughout the pass band and in the regions of transition from transmission to attenuation, thereby reducing and flattening the loss in the pass band, sharpening the cut-off, and increasing the attenuation in the suppression band.

Fig. 3 shows a mid-series, confluent, band-pass filter section of the ladder type. Each of the series impedance branches 21 and 22 is made up of a capacitor in series with an inductor, and the interposed shunt branch 23 comprises a capacitor in parallel with an inductor. A shunt negative-resistance network N2, which may be of the type shown in Fig. 1, is connected in shunt with the shunt filter branch 23. The network N2 is designed to compensate the undesired dissipation in the shunt branch 23, and also part or all of that associated with the series branches 21 and 22, throughout the entire pass band and including the transition regions, thereby improving the transmission characteristic of the filter in the manner described above in connection with Fig. 2. Part or all of the resistance associated with the end filter branches 21 and 22 may be allowed for in choosing the impedances of the source connected to the terminals 16, 17 and the load connected to the terminals 18, 19.

Fig. 4 shows two mid-series, confluent, band-elimination, ladder-type filter sections connected in tandem. Each of the series impedance branches 25, 26, and 27 comprises a capacitor in parallel with an inductor. Each of the shunt branches 28 and 29 is constituted by a capacitor in series with an inductor. The central series branch 26 also includes in shunt therewith a negative-resistance network N3, which may be of the type shown in Fig. 1. The network N3 may be designed to compensate the undesired dissipation in the branches 26, 28, and 29, and also part or all of that associated with the end branches 25 and 27, especially throughout the pass band and in the transition regions. In some cases, the dissipation in certain of the branches may be compensated more perfectly or more advantageously by the inclusion of one or more additional negative-resistance networks. For example, Fig. 4 shows a network N4, which may also be of the type shown in Fig. 1, connected in shunt with the inductor in the shunt branch 28. The network N4 is especially effective in compensating the undesired energy dissipation in the branch 28 and the adjacent series branches 25 and 26. Similarly, a negative-resistance network may be shunted around the inductor in the shunt branch 29. It will be apparent that either N3 or N4, or both, may be employed. The addition of the network N3 or N4, or both, greatly improves the transmission characteristic of the filter, as described above in connection with Fig. 2.

It is to be understood that the above-described arrangements are illustrative of the application of the principles of the invention. Numerous other arrangements may be devised by those skilled in the art without departing from the spirit and scope of the invention.

What is claimed is:

1. A negative-resistance network comprising two terminals, two transistors, a source of direct voltage, two capacitors, two resistive impedances each having a substantial resistive component in the operating frequency range of the network, and three resistors, each of said transistors having a base, a collector, and an emitter, one of said terminals being connected to the base of one of said transistors, one of said capacitors and the first of said resistors being connected in series between the base of said one transistor and the collector of the other of said transistors, the other of said capacitors being connected between the collector of said one transistor and the base of said other transistor, the second and the third of said resistors being connected in series between said collectors, said resistive impedances being connected in series between said emitters, said source being connected between the terminal common to said second and third resistors and the terminal common to said resistive impedances, and the other of said network terminals being connected to the terminal common to said resistive impedances.

2. A network in accordance with claim 1 in which said first resistor is adjustable.

3. A network in accordance with claim 1 in which said transistors are of the junction type.

4. A network in accordance with claim 1 which includes a fourth resistor connected between the base of said one transistor and said other network terminal.

5. A network in accordance with claim 1 which includes a fourth resistor connected between the base of said other transistor and said other network terminal.

6. A network in accordance with claim 5 which includes a fifth resistor connected between the base of said one transistor and said other network terminal.

7. In combination, a network in accordance with claim 1 and a reactive impedance branch including an inductor, said inductor being connected to the terminals of said network and said network providing negative resistance for compensating dissipation in said branch.

8. In combination, a network in accordance with claim 1 and a wave filter comprising a reactive impedance branch which includes an inductor, said inductor being connected to the terminals of said network and said network providing negative resistance for compensating dissipation in said branch.

References Cited in the file of this patent

UNITED STATES PATENTS

| | | |
|---|---|---|
| 1,971,919 | Roberts | Aug. 28, 1934 |
| 2,541,322 | Barney | Feb. 13, 1951 |